(12) United States Patent
Okuji et al.

(10) Patent No.: US 8,758,883 B2
(45) Date of Patent: Jun. 24, 2014

(54) LUMINESCENT SHEET HAVING SEE-THROUGH PROPERTY, LUMINESCENT DECORATIVE MATERIAL, AND METHOD OF PRODUCING LUMINESCENT SHEET

(75) Inventors: Shigeto Okuji, Tokyo (JP); Masahiko Sekiya, Tokyo (JP); Shinichi Hoshi, Tokyo (JP)

(73) Assignee: Lintec Corporation, Tokyo (JP)

( * ) Notice: Subject to any disclaimer, the term of this patent is extended or adjusted under 35 U.S.C. 154(b) by 462 days.

(21) Appl. No.: 11/868,235

(22) Filed: Oct. 5, 2007

(65) Prior Publication Data
US 2008/0090030 A1 Apr. 17, 2008

(30) Foreign Application Priority Data
Oct. 12, 2006 (JP) .................. 2006-278681

(51) Int. Cl.
B32B 3/26 (2006.01)
B32B 37/16 (2006.01)
B29C 65/00 (2006.01)
H01J 1/70 (2006.01)
H01J 1/72 (2006.01)

(52) U.S. Cl.
USPC ........... 428/201; 428/323; 156/277; 313/505; 313/506

(58) Field of Classification Search
USPC ............... 428/29, 690, 1.1–1.62, 201, 328; 313/498, 510–511, 505–506, 509; 156/277
See application file for complete search history.

(56) References Cited

U.S. PATENT DOCUMENTS

| | | | | |
|---|---|---|---|---|
| 3,504,214 A * | 3/1970 | Cox et al. | ........ | 313/507 |
| 3,991,227 A * | 11/1976 | Carlson et al. | ........ | 427/576 |
| 4,396,864 A * | 8/1983 | Suntola et al. | ........ | 313/506 |
| 4,672,264 A * | 6/1987 | Higton | ........ | 313/503 |
| 5,994,836 A * | 11/1999 | Boer et al. | ........ | 313/504 |
| 6,242,076 B1 * | 6/2001 | Andriash | ........ | 428/138 |
| 6,420,031 B1 | 7/2002 | Parthasarathy et al. | | |
| 6,506,475 B1 * | 1/2003 | Hill | ........ | 428/194 |
| 2002/0067125 A1 * | 6/2002 | Nogaki et al. | ........ | 313/510 |
| 2002/0149547 A1 | 10/2002 | Robertson | | |
| 2004/0095457 A1 * | 5/2004 | Pokorny et al. | ........ | 347/171 |
| 2005/0236984 A1 | 10/2005 | Aoyama et al. | | |
| 2006/0164333 A1 | 7/2006 | Robertson | | |

FOREIGN PATENT DOCUMENTS

| | | |
|---|---|---|
| CN | 1530897 A | 9/2004 |
| CN | 1691853 A | 11/2005 |
| EP | 0 259 213 A1 | 3/1988 |

(Continued)

OTHER PUBLICATIONS

Japanese Office Action issued Dec. 20, 2011, in Patent Application No. 2006-278681.

(Continued)

*Primary Examiner* — Prashant J Khatri
(74) *Attorney, Agent, or Firm* — Oblon, Spivak, McClelland, Maier & Neustadt, L.L.P.

(57) ABSTRACT

The claimed invention relates to a luminescent decorative material, which is visible even at night, of which different decorative properties are obtained in the daytime or under lighting due to the presence or absence of luminescence. The claimed invention provide a luminescent sheet (plane sheet) having see-through property and containing a transparent part, through which it is possible to see the area behind the plane sheet, and a luminescent part.

21 Claims, 16 Drawing Sheets

(56) References Cited

FOREIGN PATENT DOCUMENTS

| | | |
|---|---|---|
| EP | 0 259 213 B1 | 3/1988 |
| EP | 1 460 609 A2 | 9/2004 |
| EP | 1 715 523 A1 | 10/2006 |
| JP | 5-92694 | 4/1993 |
| JP | 5-92695 | 4/1993 |
| JP | 6-186525 | 7/1994 |
| JP | 2005-227697 | 8/2005 |

OTHER PUBLICATIONS

Chinese Office Action issued Jul. 13, 2011, in Patent Application No. 200710180781.7 (with partial English-language translation).

* cited by examiner

<Illuminated face (through which it is difficult to see the area behind the luminescent sheet)>

<The side from which it is easy to see the area in front of the luminescent sheet>

Front face · Reverse face

LUMINESCENT SHEET HAVING SEE-THROUGH PROPERTY, LUMINESCENT DECORATIVE MATERIAL, AND METHOD OF PRODUCING LUMINESCENT SHEET

BACKGROUND OF THE INVENTION

1. Field of the Invention

The present invention relates to luminescent sheets used as advertising media, decorative media, or security sheets, which are applied to windows of commercial buildings, vehicles, and the like, and also relates to a method of producing the same.

2. Background Art

In order to produce a special-purpose decorative material (sheet) having see-through property, on both sides of which different images are separately formed, the following methods and the like have been suggested and practically used: a method of obtaining a special-purpose decorative material, wherein sheets, upon each of which an image consisting of different pixels is drawn in dots, are laminated to each other in an accurate manner and then one of the sheets is removed such that pixels of the removed sheet are transferred onto pixels of the other sheet (JP Patent Publication (Kokai) No. 5-92694 A (1993)); and a method wherein inks having different adhesion properties are used for image drawing and then unnecessary ink portions are selectively removed using an adhesive sheet (JP Patent Publication (Kokai) No. 5-92695 A (1993)). At present, in view of design properties, special-purpose decorative materials have been widely used in stores and on commercial vehicles for both commercial and private uses.

However, special-purpose decorative materials produced by the above methods have the drawback of being only visible in the daytime or under lighting, but being invisible at night.

SUMMARY OF THE INVENTION

It is an objective of the present invention to provide a luminescent decorative material, which is visible even in no-light environments at night, of which different decorative properties are visible in the daytime or under lighting due to the presence or absence of luminescence caused by intentional switching of a power source between on-off modes.

The present invention is summarized as follows.

(1) A luminescent sheet, which is a plane sheet, having see-through property and comprising a transparent part, through which it is possible to see the area behind the plane sheet, and a luminescent part.
(2) The luminescent sheet according to item (1), wherein the luminescent part comprises a $1^{st}$ transparent electrode layer, a luminescent layer, and a $2^{nd}$ transparent electrode layer.
(3) The luminescent sheet according to item (2), wherein either one of or both the $1^{st}$ transparent electrode layer and the $2^{nd}$ transparent electrode layer is/are formed in stripe pattern.
(4) The luminescent sheet according to any one of items (1) to (3), partially containing a see-through control part comprising a see-through control layer.
(5) The luminescent sheet according to item (4), wherein the see-through control layer is prepared with a colored conductive material or coloring ink.
(6) The luminescent sheet according to any one of items (1) to (5), having a dielectric layer.
(7) The luminescent sheet according to item (6), wherein at least the luminescent layer, the see-through control layer, and the dielectric layer are formed in a matrix pattern.
(8) The luminescent sheet according to any one of items (2) to (7), wherein the $1^{st}$ transparent electrode layer and the $2^{nd}$ transparent electrode layer are both formed in stripe pattern and the stripe pattern are not parallel to each other.
(9) The luminescent sheet according to any one of items (1) to (8), which is produced by patterning.
(10) The luminescent sheet according to item (9), wherein the patterning is carried out using masking tape or by screen printing, inkjet printing, or gravure printing.
(11) A luminescent decorative material, which is obtained by printing on the luminescent sheet according to any one of items (1) to (10) in a manner such that the transparent part, through which it is possible to see the area behind the plane sheet, is remaining.
(12) A method of producing the luminescent sheet having see-through property according to item (2), comprising the steps of:

forming at least a $1^{st}$ transparent electrode layer and a luminescent layer on a $1^{st}$ transparent substrate so as to prepare a $1^{st}$ laminate;

forming at least a $2^{nd}$ transparent electrode layer on a $2^{nd}$ transparent substrate so as to prepare a $2^{nd}$ laminate; and allowing the $1^{st}$ laminate and the $2^{nd}$ laminate together.

(13) The method according to item (12), wherein the dielectric layer is formed on the luminescent layer of the $1^{st}$ laminate and then the $1^{st}$ laminate is joined the $2^{nd}$ laminate.
(14) The method according to item (13), wherein patterning is carried out in a manner such that at least the luminescent layer and the dielectric layer are formed in a matrix pattern.
(15) The method according to item (14), wherein patterning is carried out using masking tape or by screen printing, inkjet printing, or gravure printing.

Effects of the Invention

According to the present invention, it is possible to provide a luminescent decorative material, of which a wide variety of decorative properties are visible under various lighting environments such as day and night environments and well-lit and dark rooms.

Figure 1:
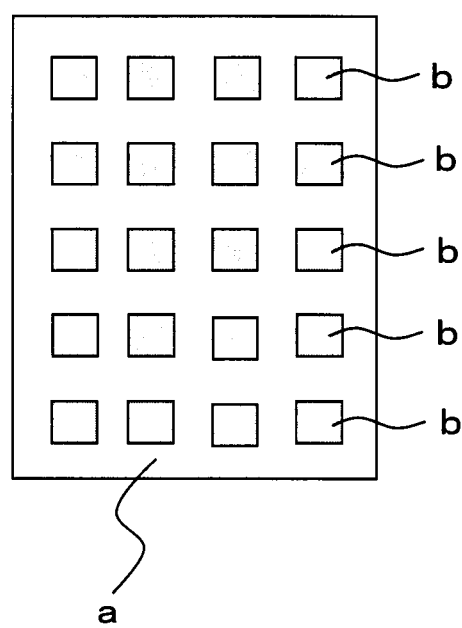
FIG. 1 is a plane view of a luminescent sheet for explanation of the present invention.

Each numeral and character in the figures means the following.

a - - - transparent part
b - - - luminescent part
1 - - - $1^{st}$ transparent substrate (polyethylene terephthalate sheet)
2 - - - masking tape
2' - - - masking tape
3 - - - $1^{st}$ transparent electrode layer (transparent conductive membrane)
4 - - - luminescent layer
5 - - - dielectric layer
6 - - - see-through control layer
7 - - - $2^{nd}$ transparent substrate (polyethylene terephthalate sheet)
8 - - - $2^{nd}$ transparent electrode layer (transparent conductive membrane)

DESCRIPTION OF THE PREFERRED EMBODIMENTS

The luminescent sheet (plane sheet) of the present invention comprises a transparent part (a), through which it is possible to see the area behind the plane sheet, and a luminescent part (b) as shown in FIG. 1. Herein, the term "transparent part (a)" indicates a transparent part through which it is possible to see the area behind the plane sheet. The term "luminescent part (b)" indicates a luminescent part comprising a luminescent layer 4 described below. Further, it is preferable that the luminescent sheet of the present invention have an image printed thereon in a manner such that a see-through transparent part thereof is remaining.

With the above configuration, when the area behind a plane sheet is brighter than the area in front thereof, an observer in front thereof can see the area behind the plane sheet. In such case, even when the surface of a plane sheet has an image printed thereon, such image is only visible with difficulty (but depending on brightness) and thus the area behind the plane sheet is visible. Meanwhile, when the area behind a plane sheet is darker than the area in front thereof, the area behind the plane sheet is only visible with difficulty. In such case, if the surface of a plane sheet has a text or image printed thereon, such printed text or image is clearly visible.

In addition, when the luminescent part is allowed to emit light, it becomes difficult to see through the plane sheet even in a case in which the area behind the plane sheet is bright. As a result, the plane sheet itself is bright. Further, if the surface of the plane sheet has a text or image printed thereon, effects can be obtained whereby such printed text or image looks shiny due to backlight.

Figure 9:
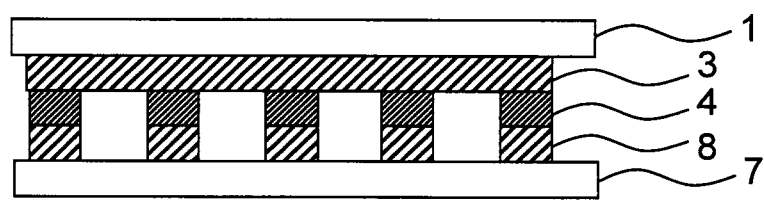
FIG. 9 is a cross-sectional view for explanation of a preferred embodiment of the present invention.

In a preferred embodiment of the luminescent sheet of the present invention, at least a $1^{st}$ transparent electrode layer 3, a luminescent layer 4, and a $2^{nd}$ transparent electrode layer 8 are provided on a $1^{st}$ transparent substrate 1 as shown in FIG. 9. In the above preferred embodiment, either one of or both the $1^{st}$ transparent electrode layer 3 and the $2^{nd}$ transparent electrode layer 8 is/are formed in stripe pattern. Preferably, both layers are formed in stripe pattern.

Figure 10:
FIG. 10 is a cross-sectional view for explanation of a preferred embodiment of the present invention.
Figure 10:
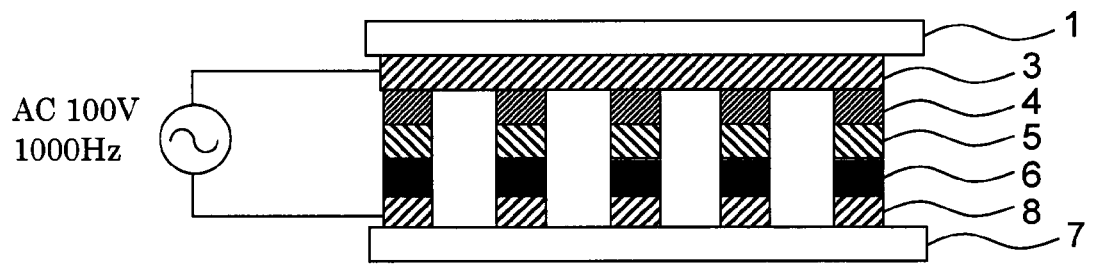

A preferred embodiment of the present invention contains a dielectric layer 5 and/or partially contains a see-through control layer 6 as shown in FIG. 10.

In FIG. 10, a dielectric layer 5 is provided between a luminescent layer 4 and a see-through control layer 6, but its location is not limited thereto. Thus, the dielectric layer 5 may be provided between a $1^{st}$ transparent electrode layer 3 and a luminescent layer 4 or between a see-through control layer 6 and a $2^{nd}$ transparent electrode layer 8.

Further, in FIG. 10, the see-through control layer 6 is provided between the dielectric layer 5 and the $2^{nd}$ transparent electrode layer 8, but its location is not limited thereto. It may be provided between the luminescent layer 4 and the dielectric layer 5, between the $2^{nd}$ transparent electrode layer 8 and a $2^{nd}$ transparent substrate 7, or on the surface of the $2^{nd}$ transparent substrate 7 that is opposite the surface on which the $2^{nd}$ transparent electrode layer 8 has been provided. In a plane view, it is preferable that a see-through control part comprising the see-through control layer 6 be partially provided. Preferably, such see-through control part is provided at a location at which it overlaps a luminescent part. Preferably, the size of a see-through control part is as large as or larger than that of the corresponding luminescent part in a manner such that the luminescent part is entirely covered by the see-through control part. With such configuration, when an illuminated face (which is on the opposite side of the luminescent layer against the face on which the see-through control layer exists) is emitting, it is possible to prevent light leaking to the face opposite the illuminated face. The see-through control layer must be provided on the opposite side of the luminescent layer against the side on which desired luminescence is caused.

In a preferred embodiment of the present invention, the above see-through control layer 6 is prepared with a colored conductive material or coloring ink. In a preferred embodiment of the present invention, stripe pattern of the $1^{st}$ transparent electrode layer 3 and those of the $2^{nd}$ transparent electrode layer 8 are not parallel to each other. More preferably, they are orthogonal to each other.

A transparent substrate used for the luminescent sheet of the present invention is not particularly limited as long as it is transparent. However, it is preferable that such transparent substrate be flexible. Examples of material used for such transparent substrate include: polyester such as polyethylene terephthalate, polybutylene terephthalate, or polyethylene naphthalate; polycarbonate; polyamide such as wholly aromatic polyamide, nylon 6, nylon 66, or nylon copolymer; polyacrylate such as polymethyl methacrylate; and glass. Such transparent substrate is used in a sheet form having a thickness of approximately 10 to 150 μm.

Examples of material used for a $1^{st}$ transparent electrode layer and a $2^{nd}$ transparent electrode layer include, but are not particularly limited to: a thin film made of metallic oxide such as indium tin oxide (ITO), indium zinc oxide, indium oxide, or tin oxide; and a ultra-thin film made of a noble metal. When a thin film made of metallic oxide is used as a $1^{st}$ transparent electrode layer and a $2^{nd}$ transparent electrode layer, the thickness thereof is generally 50 to 50000 nm. A $1^{st}$ transparent electrode layer and a $2^{nd}$ transparent electrode layer can be formed by physical deposition methods such as a vacuum deposition method, an ion plating method, and a sputtering method, by chemical vapor deposition methods such as a thermal CVD (chemical vapor deposition) method, a plasma CVD method, and a photo-CVD method, or by printing or coating with the use of a conductive paste dispersed in a binder or the like.

According to the present invention, a luminescent layer is provided between a $1^{st}$ transparent electrode layer and a $2^{nd}$ transparent electrode layer. When a luminescent layer is transparent, it may be formed in all of a planar layer in a manner such that it covers one surface of each transparent electrode layer. When a luminescent layer is opaque, it must be partially provided in a manner such that a transparent part (of a luminescent sheet) is remaining. Further, a luminescent layer is preferably formed in a matrix pattern. Furthermore, a luminescent layer is preferably provided at a location at which it is sandwiched between a $1^{st}$ transparent electrode layer and a $2^{nd}$ transparent electrode layer.

Material used for a luminescent layer is not particularly limited as long as material such as EL (electroluminescence) material that can emit light is used. Examples of such material that may be used include: inorganic EL material such as ZnS:Cu or ZnS:Mn; low-molecular-weight organic EL material such as an aluminum-quinolinol complex or an aromatic diamine derivative (e.g., a triphenyldiamine derivative); and high-molecular-weight organic EL material such as polyphenylene vinylene. In general, a luminescent layer has a thickness of 0.1 to 50 μm. For instance, when inorganic EL material is used, a luminescent layer can be formed by sputtering or coating with the use of a solution containing luminescent material, followed by drying. When organic EL material is used, a vacuum deposition method, an inkjet method, or the like can be used.

According to the present invention, it is preferable to provide a dielectric layer for the improvement of luminescence efficiency. A dielectric layer is provided between a $1^{st}$ transparent electrode layer and a $2^{nd}$ transparent electrode layer and preferably between a luminescent layer and a $2^{nd}$ transparent electrode layer. In addition, a dielectric layer is preferably formed in a matrix pattern. Further, a dielectric layer is preferably provided at a location at which it is sandwiched between a luminescent layer and a $2^{nd}$ transparent electrode layer. Preferred examples of material used for a dielectric layer include high-dielectric constant materials such as barium titanate, silicon oxide, silicon nitride, antimony-doped tin oxide, and yttrium oxide. The thickness of a dielectric layer is generally 0.1 to 50 μm. A dielectric layer can be formed by, for example, sputtering or by coating with the use of a solution containing the above material, followed by drying.

Further, according to the present invention, it is preferable to partially provide a see-through control layer having a black or brown color that causes relatively little reflection or scattering of exterior light. When such see-through control layer is provided, specific effects can be obtained whereby it is difficult to see the area behind a luminescent sheet through an illuminated face thereof while it is relatively easy to see the area in front of the luminescent face from the opposite side.

A see-through control layer is provided (directly or via a dielectric layer) between a luminescent layer and a $1^{st}$ transparent electrode layer or a $2^{nd}$ transparent electrode layer by a method involving, for example, inkjet printing, screen printing, or gravure printing with the use of a colored conductive paste. When a colored conductive paste is used, a see-through control layer is preferably formed in a matrix pattern. Further, a see-through control layer is preferably provided at a location at which it is sandwiched between a $1^{st}$ transparent electrode layer and a $2^{nd}$ transparent electrode layer. Such colored conductive paste is not particularly limited as long as it has a color that does not cause light reflection or scattering.

Examples of a conductive paste that can be used include polymer resin in which silver filler or carbon black has been dispersed and a conductive polymer obtained by doping polymer material such as polyacetylene with halogen material.

In addition, when such colored conductive paste is not used, printing is carried out on the surface of either a $1^{st}$ transparent substrate or a $2^{nd}$ transparent substrate by inkjet printing, screen printing, gravure printing, or the like with the use of a conventional ink that has a color that does not cause light reflection or scattering. Thus, effects similar to those obtained with the use of a colored conductive paste can be obtained.

The luminescent sheet of the present invention can be produced in the following manner: at least a $1^{st}$ transparent electrode layer and a luminescent layer that is pixelated are formed on the above transparent substrate ($1^{st}$ transparent substrate) that is located in side of an illuminated face such that a $1^{st}$ laminate is prepared; at least a $2^{nd}$ transparent electrode layer is formed on a $2^{nd}$ transparent substrate such that a $2^{nd}$ laminate is individually prepared; and the $1^{st}$ laminate and the $2^{nd}$ laminate are bonded together. When a dielectric layer is provided, it is formed on the luminescent layer of the $1^{st}$ laminate, and then the $1^{st}$ laminate is joined the $2^{nd}$ laminate.

When another see-through control layer is provided, it can be provided by applying a colored conductive paste on the dielectric layer of the $1^{st}$ laminate or by carrying out printing on either the $1^{st}$ transparent substrate or the $2^{nd}$ transparent substrate with an ink having a color that does not cause light reflection or scattering.

In the case of a luminescent sheet produced by patterning method with the use of masking tape or by patterning methods involving screen printing, inkjet printing, gravure printing, or the like, a luminescent layer emits light when a voltage is applied between a $1^{st}$ transparent electrode layer and a $2^{nd}$ transparent electrode layer. Accordingly, it becomes possible to visually recognize decorative properties that differ from those obtained without luminescence. Further, such decorative properties can be well seen even at night. The above patterning methods may be used in combinations of two or more.

When the aforementioned luminescent layer, the dielectric layer, and the like are formed in a matrix pattern by patterning, light can be emitted from selected pixels of the matrix pattern. In such case, a still image can be displayed while giving an impression similar to that obtained from an animation.

For instance, an example of a method of patterning with the use of masking tape is a method comprising the steps of: forming masking layers between the $1^{st}$ transparent substrate and the $1^{st}$ transparent electrode layer and between the $1^{st}$ transparent electrode layer and the luminescent layer so as to allow at least the luminescent layer and the dielectric layer to be formed in a matrix pattern upon production of the $1^{st}$ laminate; and removing the masking layers before allowing the $1^{st}$ laminate and the $2^{nd}$ laminate together.

Further, printing can be carried out on the luminescent sheet of the present invention in a manner such that decorative effects can be obtained, provided that a transparent part of the luminescent sheet, through which it is possible to see, is remaining. Printing may be carried out either on the illuminated face or on the opposite face of the luminescent sheet, or on both faces. For instance, as shown FIG. 16, printing can be carried out on both sides of a $1^{st}$ transparent substrate 1 and of a $2^{nd}$ transparent substrate 7 shown in FIG. 10. When printing is carried out on the $1^{st}$ transparent electrode layer 3 side of a $1^{st}$ transparent substrate 1, printing is carried out before a $1^{st}$ transparent electrode layer 3 is provided. In addition, when printing is carried out on the 2$^{nd}$ transparent electrode layer 8 side of a 2$^{nd}$ transparent substrate 7, printing is carried out before a 2$^{nd}$ transparent electrode layer 8 is provided. Examples of inks that can be used for printing include, but are not particularly limited to, a wide variety of conventional inks. Also, examples of printing methods that can be used include, but are not particularly limited to, conventional printing methods involving screen printing, gravure printing, flexographic printing, inkjet printing, and the like.

In cases in which the luminescent sheet of the present invention that serves as a luminescent decorative material is used as an advertising medium, a decorative medium, or a security sheet that is applied to advertising displays or windows of commercial buildings, vehicles, and the like, such luminescent decorative material can be protected by applying an adhesive sheet (protective adhesive sheet) to both sides thereof. Such protective adhesive sheet to be used is not particularly limited as long as it is transparent. Particularly preferably, an anti-scratch (hard-coating) treatment is carried out on the opposite side of such adhesive sheet against face on which an adhesive is applied. In addition, when such luminescent decorative material is attached to a wall or a window glass, an adhesive is coated to one side of the luminescent decorative material such that the material can be attached to a wall or a window glass.

EXAMPLES

The present invention is hereafter described in greater detail with reference to the following examples, although the technical scope of the present invention is not limited thereto.

Example 1

Figure 2:
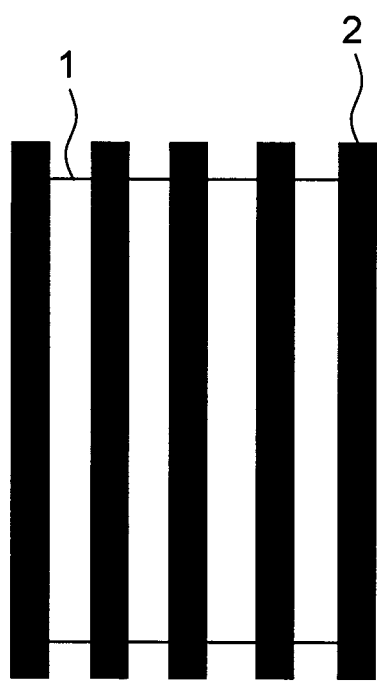
FIG. 2 illustrates a state in which masking tape has been applied to a $1^{st}$ transparent substrate (polyethylene terephthalate sheet).
Figure 3:
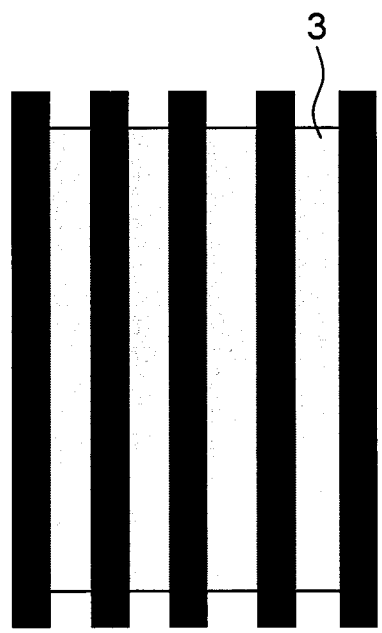
FIG. 3 illustrates a state in which a transparent conductive membrane has been formed.

As shown in FIG. 2, masking tape 2 (1 cm in width and 20 μm in thickness, Adwill C-902, Lintec Corporation) was applied at 1-cm intervals in a length direction to a polyethylene terephthalate sheet 100 μm in thickness (DIAFOIL T-100, Mitsubishi Polyester Film Corporation) (FIG. 2) serving as a 1$^{st}$ transparent substrate 1. Then, a 1$^{st}$ transparent electrode layer 3 of 100 nm in thickness was formed in stripe pattern by sputtering with ITO (FIG. 3).

Figure 4:
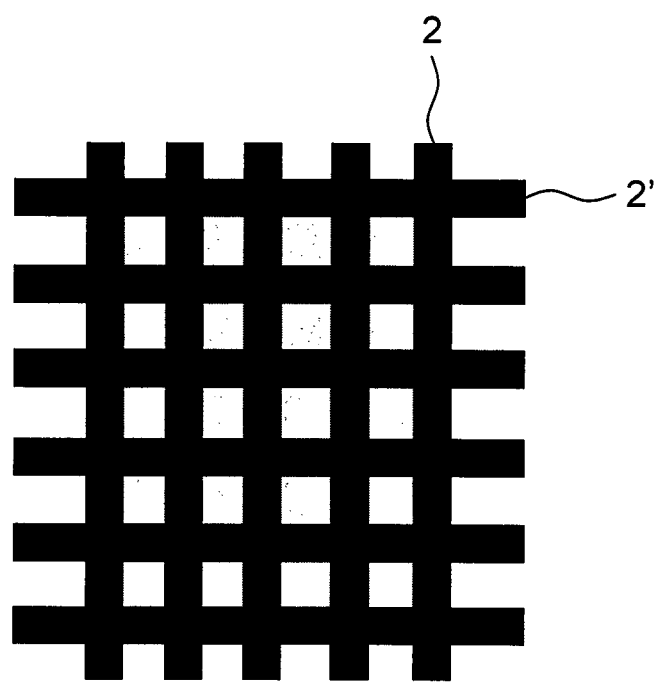
FIG. 4 illustrates a state in which masking tape has been applied in perpendicular direction against the transparent conductive membrane of FIG. 3.

Further, masking tape 2' (1 cm in width and 20 μm in thickness) similar to the above masking tape was applied thereto at 1-cm intervals in perpendicular direction (FIG. 4).

Figure 5:
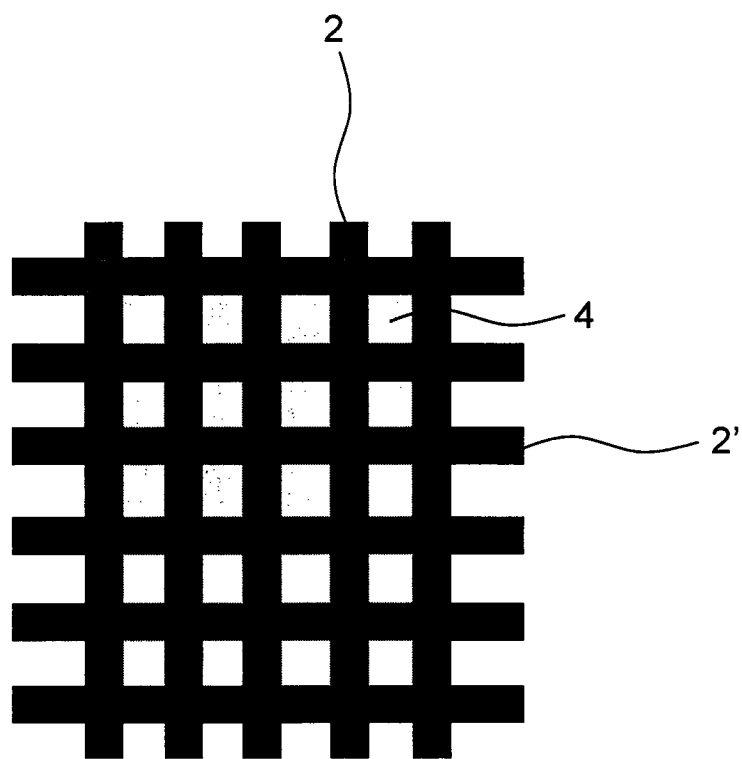
FIG. 5 illustrates a state in which a luminescent layer has been coated.
Figure 6:
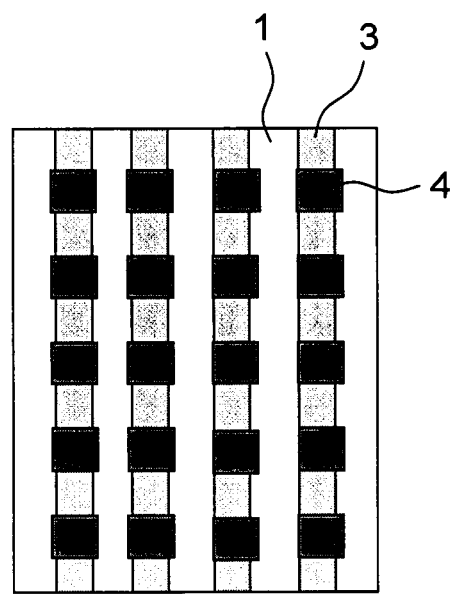
FIG. 6 illustrates a state in which masking tape has been removed from the state shown in FIG. 5.

Subsequently, a ZnS:Cu solution (FEL-190, Fujikura Kasei Co., Ltd.) was coated thereto using a Mayer bar such that a luminescent layer 4 was formed to have a dried thickness of 40 μm (FIG. 5). Then, masking tape 2 and masking tape 2' were removed therefrom (FIG. 6).

Figure 7:
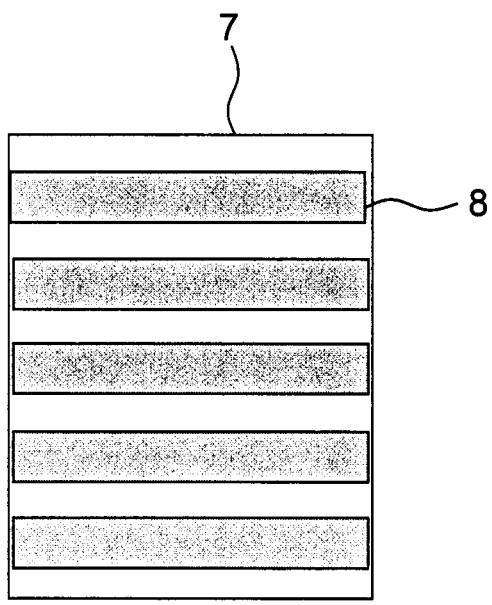
FIG. 7 illustrates a state in which a transparent conductive membrane has been formed on a $2^{nd}$ transparent substrate (polyethylene terephthalate sheet).

Masking tape 2 (1 cm in width and 20 μm in thickness, Adwill C-902, Lintec Corporation) was applied at 1-cm intervals in perpendicular direction to another polyethylene terephthalate sheet 100 μm in thickness (DIAFOIL T-100, Mitsubishi Polyester Film Corporation) serving as a 2$^{nd}$ transparent substrate 7. Then, a 2$^{nd}$ transparent electrode layer 8 of 100 nm in thickness was formed in stripe pattern by sputtering with ITO. Masking tape 2 was removed therefrom (FIG. 7).

Figure 8:
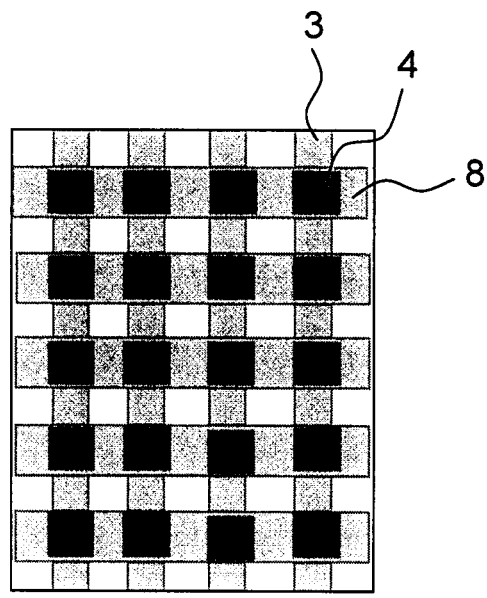
FIG. 8 illustrates a state in which the ITO face shown in FIG. 7 has been laminated to a luminescent layer shown in FIG. 6 so that they are bonded together.

Subsequently, the 2$^{nd}$ transparent electrode layer 8 was laminated to the luminescent layer 4 (FIG. 6) in a manner such that the stripe pattern of the transparent electrode layers 3 and 8 were orthogonally bonded together (FIG. 8). Drying was carried out using a dryer at 100° C. for 30 minutes. Accordingly, a luminescent sheet was obtained (FIG. 9).

Figure 11:
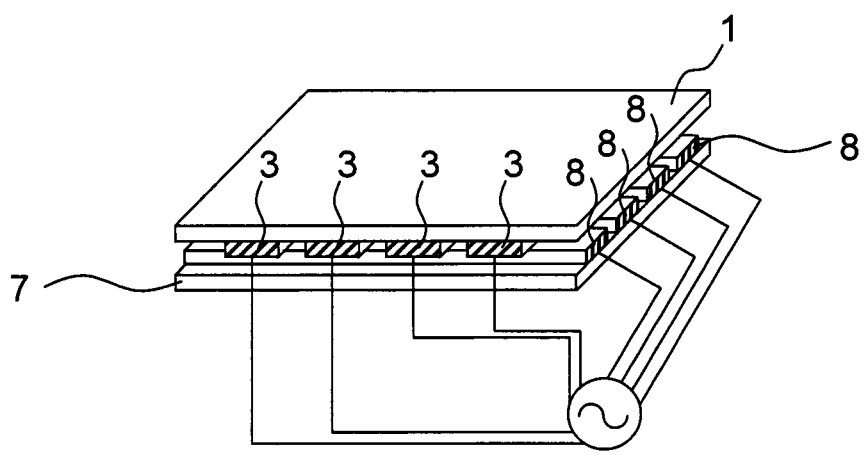
FIG. 11 illustrates connection status upon voltage application.

As shown in FIG. 11, an AC voltage of 100 V with a frequency of 1000 Hz was applied to the thus obtained luminescent sheet in the direction of the sheet's thickness via voltage connection. As a result, the luminescent sheet was confirmed to be excellent in visibility even at night, and furthermore, to have see-through.

Example 2

As shown in FIG. 2, masking tape 2 (1 cm in width and 20 μm in thickness, Adwill C-902, Lintec Corporation) was applied at 1-cm intervals in a length direction to a polyethylene terephthalate sheet 100 μm in thickness (DIAFOIL T-100, Mitsubishi Polyester Film Corporation) (FIG. 2) serving as a 1$^{st}$ transparent substrate 1. Then, a 1$^{st}$ transparent electrode layer 3 of 100 nm in thickness was formed in stripe pattern by sputtering with ITO (FIG. 3).

Further, masking tape 2' (1 cm in width and 20 μm in thickness) similar to the above masking tape was applied thereto at 1-cm intervals in perpendicular direction (FIG. 4).

Figure 12:
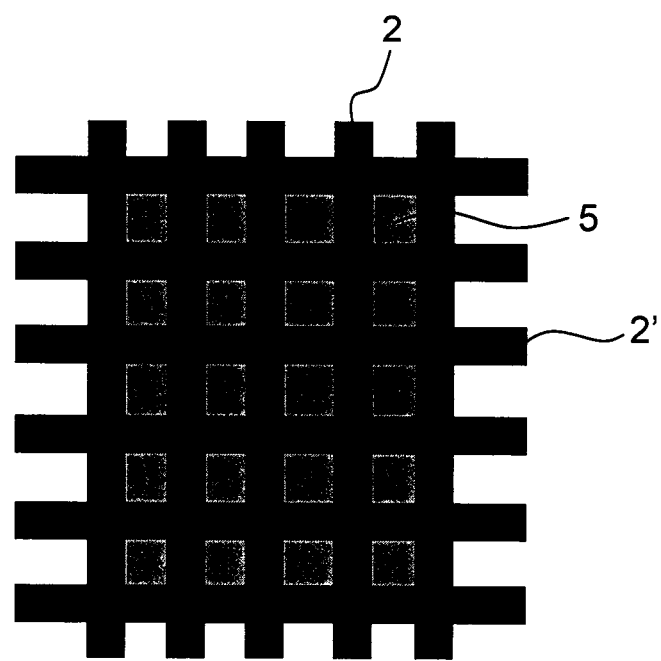
FIG. 12 illustrates a state in which a dielectric layer has been laminated to the luminescent layer shown in FIG. 5.

Subsequently, a ZnS:Cu solution (FEL-190, Fujikura Kasei Co., Ltd.) was coated thereto using a Mayer bar such that a luminescent layer 4 (FIG. 5) was formed to have a dried thickness of 40 μm. After drying using a dryer at 100° C. for 30 minutes, a barium titanate solution (FEL-615, Fujikura Kasei Co., Ltd.) was further coated thereto such that a dielectric layer 5 (FIG. 12) was formed to have a dried thickness of 30 μm. Drying was carried out using a dryer at 100° C. for 30 minutes as described above.

Figure 13:
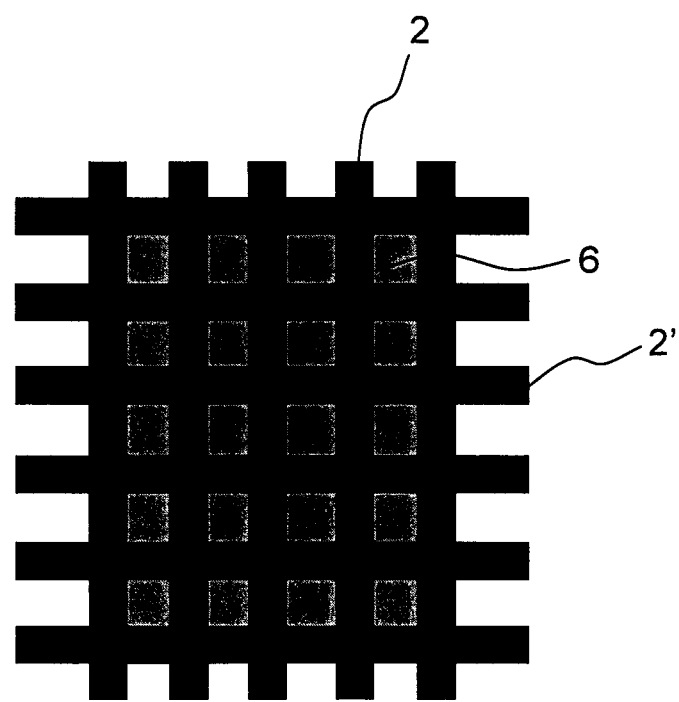
FIG. 13 illustrates a state in which a see-through control layer is laminated to the dielectric layer shown in FIG. 12.
Figure 14:
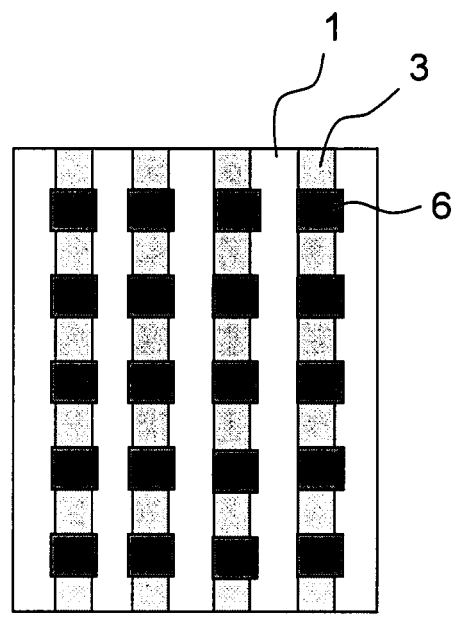
FIG. 14 illustrates a state in which masking tape has been removed from the state shown in FIG. 13.

Thereafter, a conductive paste (FEA-685, Fujikura Kasei Co., Ltd.) was coated to the above dielectric layer 5 such that a see-through control layer 6 was formed to have a thickness of 30 μm (FIG. 13). Then, masking tape 2 and masking tape 2' were removed therefrom (FIG. 14).

Masking tape 2 (1 cm in width and 20 μm in thickness, Adwill C-902, Lintec Corporation) was applied at 1-cm intervals in perpendicular direction to another polyethylene terephthalate sheet 100 μm in thickness (DIAFOIL T-100, Mitsubishi Polyester Film Corporation) serving as a 2$^{nd}$ transparent substrate 7. Then, a 2$^{nd}$ transparent electrode layer 8 of 100 nm in thickness was formed in stripe pattern 100 nm in thickness by sputtering with ITO (FIG. 7). Masking tape 2 was removed therefrom (FIG. 7).

Figure 15:
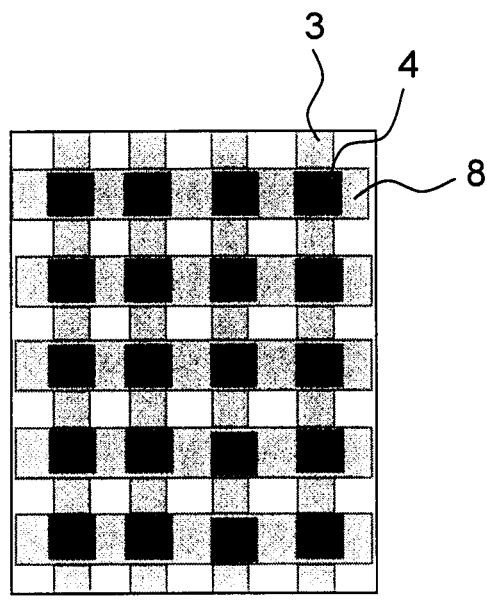
FIG. 15 illustrates a state in which the ITO face shown in FIG. 7 has been laminated to a see-through control layer shown in FIG. 14 so that they are bonded together.

Subsequently, the 2$^{nd}$ transparent electrode layer 8 was laminated to a see-through control layer 6 (FIG. 14) in a manner such that the stripe pattern of the transparent electrode layers 3 and 8 were orthogonally bonded together (FIG. 15). Thereafter, drying was carried out using a dryer at 100° C. for 30 minutes.

As shown in FIG. 11, an AC voltage of 100 V with a frequency of 1000 Hz was applied to the thus obtained luminescent sheet in the direction of the sheet's thickness via voltage connection. As a result, the luminescent sheet was confirmed to be excellent in visibility even at night and further to have effects whereby it was possible to see therethrough from one side thereof while it was difficult to see therethrough from the other side thereof.

Example 3

A luminescent sheet was obtained in a manner similar to that used in Example 2, except that printing was carried out on a luminescent layer (ZnS:Cu), a dielectric layer (barium titanate solution), and a see-through control layer (conductive paste) using a screen printing method instead of masking tape.

As shown in FIG. 11, an AC voltage of 100 V with a frequency of 1000 Hz was applied to the thus obtained luminescent sheet in the direction of the sheet's thickness via voltage connection. As a result, the luminescent sheet was confirmed to be excellent in visibility even at night and further to have effects whereby it was possible to see therethrough from one side thereof while it was difficult to see therethrough from the other side thereof.

Example 4

A luminescent sheet was obtained in a manner similar to that used in Example 2, except that printing was carried out on a luminescent layer (ZnS:Cu), a dielectric layer (barium titanate solution), and a see-through control layer (conductive paste) using an inkjet printing method instead of masking tape.

As shown in FIG. 11, an AC voltage of 100 V with a frequency of 1000 Hz was applied to the thus obtained luminescent sheet in the direction of the sheet's thickness via voltage connection. As a result, the luminescent sheet was confirmed to be excellent in visibility even at night and further to have effects whereby it was possible to see therethrough from one side thereof while it was difficult to see therethrough from the other side thereof.

Example 5

A luminescent sheet was obtained in a manner similar to that used in Example 2, except that printing was carried out on a luminescent layer (ZnS:Cu), a dielectric layer (barium titanate solution), and a see-through control layer (conductive paste) using a gravure printing method instead of masking tape.

As shown in FIG. 11, an AC voltage of 100 V with a frequency of 1000 Hz was applied to the thus obtained luminescent sheet in the direction of the sheet's thickness via voltage connection. As a result, the luminescent sheet was confirmed to be excellent in visibility even at night and further to have effects whereby it was possible to see therethrough from one side thereof while it was difficult to see therethrough from the other side thereof.

Example 6

Figure 16:
FIG. 16 is a plane view of the luminescent decorative material of the present invention.
Figure 16:
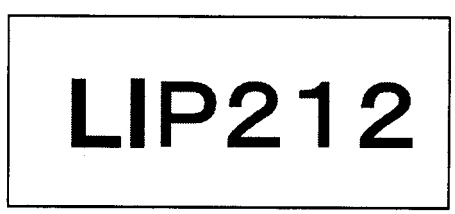

As shown in FIG. 16, a text was printed on both sides of the luminescent sheet prepared in Example 2 by an inkjet printing method such that a luminescent decorative material was prepared.

As shown in FIG. 11, an AC voltage of 100 V with a frequency of 1000 Hz was applied to the thus obtained luminescent decorative material in the direction of the sheet's thickness via voltage connection. As a result, the luminescent decorative material was confirmed to have decorative properties, to be excellent in visibility even at night, and further to have effects whereby it was possible to see therethrough from one side thereof while it was difficult to see therethrough from the other side thereof.

What is claimed is:

1. A luminescent sheet comprising a transparent part, a luminescent part, and a see-through control layer, wherein
the see-through control layer is provided over a partial portion of the luminescent sheet such that, in a plane view, the see-through control layer overlaps the luminescent part, and the size of the see-through control layer is as large as or larger than the luminescent part;
the luminescent part comprises a $1^{st}$ transparent electrode layer, a luminescent layer and a $2^{nd}$ transparent electrode layer;
the see-through control layer is sandwiched between the $1^{st}$ transparent electrode layer and the $2^{nd}$ transparent electrode layer;
at least the luminescent layer and the see-through control layer, in that order, are formed in a matrix pattern, the order being from an illuminating face-side of the luminescent sheet to a non-illuminating face-side of the luminescent sheet; and
the view of the area on the non-illuminating face-side of the luminescent sheet is less visible to a person viewing said luminescent sheet from the illuminating face thereof as compared to the view of the area on the illuminating face-side of the luminescent sheet as seen by a person viewing said luminescent sheet from the non-illuminating face thereof.

2. The luminescent sheet according to claim 1, wherein at least one of the $1^{st}$ transparent electrode layer and the $2^{nd}$ transparent electrode layer is formed in a stripe pattern.

3. The luminescent sheet according to claim 2, further comprising a dielectric layer.

4. The luminescent sheet according to claim 1, wherein the see-through control layer comprises colored conductive material or coloring ink.

5. The luminescent sheet according to claim 4, further comprising a dielectric layer.

6. The luminescent sheet according to claim 1, further comprising a dielectric layer.

7. The luminescent sheet according to claim 6, wherein at least the luminescent layer, the see-through control layer, and the dielectric layer are formed in a matrix pattern.

8. The luminescent sheet according to claim 1, wherein the $1^{st}$ transparent electrode layer and the $2^{nd}$ transparent electrode layer are both formed in a stripe pattern and said stripe patterns are not parallel to each other.

9. The luminescent sheet according to claim 1, obtained by a method comprising patterning.

10. The luminescent sheet according to claim 9, wherein the patterning is carried out using masking tape or by screen printing, inkjet printing, or gravure printing.

11. A luminescent decorative material, obtained by printing on the luminescent sheet according to claim 1 in a manner such that the transparent part is remaining.

12. The luminescent sheet according to claim 1, wherein the see-through control part prevents light from leaking to a face opposite an illuminated face when the illuminated face is emitting.

13. The luminescent sheet according to claim 1, wherein the see-through control layer has a black or brown color.

14. The luminescent sheet according to claim 1, wherein the see-through control layer comprises a colored conductive paste.

15. The luminescent sheet according to claim 14, wherein the colored conductive paste is selected from the group consisting of a polymer resin in which silver filler or carbon black has been dispersed, and a conductive polymer obtained by doping polymer material with halogen material.

16. The luminescent sheet according to claim 1, wherein the view of the area on the non-illuminating face-side of the luminescent sheet is not seen by a person viewing said luminescent sheet from the illuminating face thereof.

17. A method of producing the luminescent sheet according to claim 1, comprising:
forming at least a $1^{st}$ transparent electrode layer and a luminescent layer on a $1^{st}$ transparent substrate so as to prepare a $1^{st}$ laminate;

forming at least a $2^{nd}$ transparent electrode layer on a $2^{nd}$ transparent substrate so as to prepare a $2^{nd}$ laminate; and bonding the $1^{st}$ laminate and the $2^{nd}$ laminate together, wherein the see-through control layer is formed, between the luminescent layer and the $1^{st}$ transparent electrode layer or the $2^{nd}$ transparent electrode layer, by printing with a colored conductive paste.

18. The method according to claim 17, wherein a dielectric layer is formed on the luminescent layer of the $1^{st}$ laminate and then the $1^{st}$ laminate is joined to the $2^{nd}$ laminate.

19. The method according to claim 18, wherein patterning is carried out in a manner such that at least the luminescent layer and the dielectric layer are formed in a matrix pattern.

20. The method according to claim 19, wherein patterning is carried out using masking tape or by screen printing, inkjet printing, or gravure printing.

21. The method according to claim 17, wherein the see-through control layer is formed by printing, on the surface of either the $1^{st}$ transparent substrate or the $2^{nd}$ transparent substrate, with an ink that has a color that does not cause light reflection or scattering.

\* \* \* \* \*